United States Patent [19]
Driscoll, Sr.

[11] Patent Number: 5,585,022
[45] Date of Patent: Dec. 17, 1996

[54] ORBITING HEAD WELDING CLAMP

[76] Inventor: Dennis B. Driscoll, Sr., 15 Portship Rd., Baltimore, Md. 21222

[21] Appl. No.: 552,738

[22] Filed: Nov. 3, 1995

[51] Int. Cl.⁶ .................................................. B23K 9/28
[52] U.S. Cl. ................................................... 219/138
[58] Field of Search .................................. 219/138, 140, 219/141, 144

[56] References Cited

U.S. PATENT DOCUMENTS

| | | | |
|---|---|---|---|
| 1,316,334 | 9/1919 | Schneider | 219/138 |
| 2,347,880 | 5/1944 | Budd | 219/138 |
| 2,922,027 | 1/1960 | Dumais | 219/138 |

Primary Examiner—Clifford C. Shaw

[57] ABSTRACT

An orbiting head welding clamp comprised of an upper clamping portion. A lower clamping portion is pivotally coupled with a lower end of the upper clamping portion. A biasing spring has a first end secured to the upper clamping portion. The biasing spring has a second end secured to the lower clamping portion. An insulated handle portion is secured to the lower clamping portion. An orbiting disk is rotatably coupled with the lower clamp portion. The orbiting disk has a plurality of radial grooves formed therein. The orbiting disk has a fiberglass disk positioned thereunder to facilitate rotation thereof.

5 Claims, 3 Drawing Sheets

ORBITING HEAD WELDING CLAMP

BACKGROUND OF THE INVENTION

1. Field of the Invention

The present invention relates to an orbiting head welding clamp and more particularly pertains to allowing an electrode rod to be positioned without becoming bent with an orbiting head welding clamp.

2. Description of the Prior Art

The use of holder for electrodes is known in the prior art. More specifically, holder for electrodes heretofore devised and utilized for the purpose of holding electrodes for welding are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,071,733 to Pishioneri discloses a holder for welding electrode.

U.S. Pat. No. 4,237,365 to Lambros et al. discloses a combination arc brazing and welding electrode holder.

U.S. Pat. No. 4,656,327 to Wilcox discloses a spot welder with electrode clamp.

U.S. Pat. No. 4,820,901 to Peviani discloses a quick releasable ground and rod clamp for welding.

U.S. Pat. No. 5,143,361 to McNamara et al. discloses a power clamp.

U.S. Pat. No. 4,725,049 to Cantarinhas discloses an inverse welding clamp.

While these devices fulfill their respective, particular objective and requirements, the aforementioned patents do not describe an orbiting head welding clamp for allowing an electrode rod to be positioned without becoming bent.

In this respect, the orbiting head welding clamp according to the present invention substantially departs from the conventional concepts and designs of the prior art, and in doing so provides an apparatus primarily developed for the purpose of allowing an electrode rod to be positioned without becoming bent.

Therefore, it can be appreciated that there exists a continuing need for new and improved orbiting head welding clamp which can be used for allowing an electrode rod to be positioned without becoming bent. In this regard, the present invention substantially fulfills this need.

SUMMARY OF THE INVENTION

In the view of the foregoing disadvantages inherent in the known types of holder for electrodes now present in the prior art, the present invention provides an improved orbiting head welding clamp. As such, the general purpose of the present invention, which will be described subsequently in greater detail, is to provide a new and improved orbiting head welding clamp and method which has all the advantages of the prior art and none of the disadvantages.

To attain this, the present invention essentially comprises an upper clamping portion having a first end portion, a second end portion, and an intermediate portion therebetween. The intermediate portion is at an angle whereby the second end portion is offset from the first end portion. The second end portion has an insulated cover secured to an upper surface thereof. The device includes a lower clamping portion having a first end portion, a second end portion, and an intermediate portion therebetween. The intermediate portion has an upwardly extending portion integral with an upper surface thereof. The upwardly extending portion is pivotally coupled with a lower end of the intermediate portion of the upper clamping portion. The lower clamping portion has an insulated cover secured thereto. The device includes a biasing spring having a first end secured to an upper end of the intermediate portion of the upper clamping portion. The biasing spring has a second end secured to the first end portion of the lower clamping portion. An insulated handle portion is secured to the first end portion of the lower clamping portion. An orbiting disk is rotatably coupled with the second end portion of the lower clamp portion. The orbiting disk has a plurality of radial grooves formed therein. The orbiting disk has a fiberglass disk positioned thereunder to facilitate rotation thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved orbiting head welding clamp which has all the advantages of the prior art holder for electrodes and none of the disadvantages.

It is another object of the present invention to provide a new and improved orbiting head welding clamp which may be easily and efficiently manufactured and marketed.

It is a further object of the present invention to provide a new and improved orbiting head welding clamp which is of durable and reliable construction.

An even further object of the present invention is to provide a new and improved orbiting head welding clamp which is susceptible of a low cost of manufacture with regard to both materials and labor, and which accordingly is then susceptible of low prices of sale to the consuming public, thereby making such an orbiting head welding clamp economically available to the buying public.

Still yet another object of the present invention is to provide a new and improved orbiting head welding clamp which provides in the apparatuses and methods of the prior art some of the advantages thereof, while simultaneously overcoming some of the disadvantages normally associated therewith.

Even still another object of the present invention is to provide a new and improved orbiting head welding clamp for allowing an electrode rod to be positioned without becoming bent.

Lastly, it is an object of the present invention to provide a new and improved orbiting head welding clamp comprised of an upper clamping portion. A lower clamping portion is pivotally coupled with a lower end of the upper clamping portion. A biasing spring has a first end secured to the upper clamping portion. The biasing spring has a second end secured to the lower clamping portion. An insulated handle portion is secured to the lower clamping portion. An orbiting disk is rotatably coupled with the lower clamp portion. The orbiting disk has a plurality of radial grooves formed therein. The orbiting disk has a fiberglass disk positioned thereunder to facilitate rotation thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
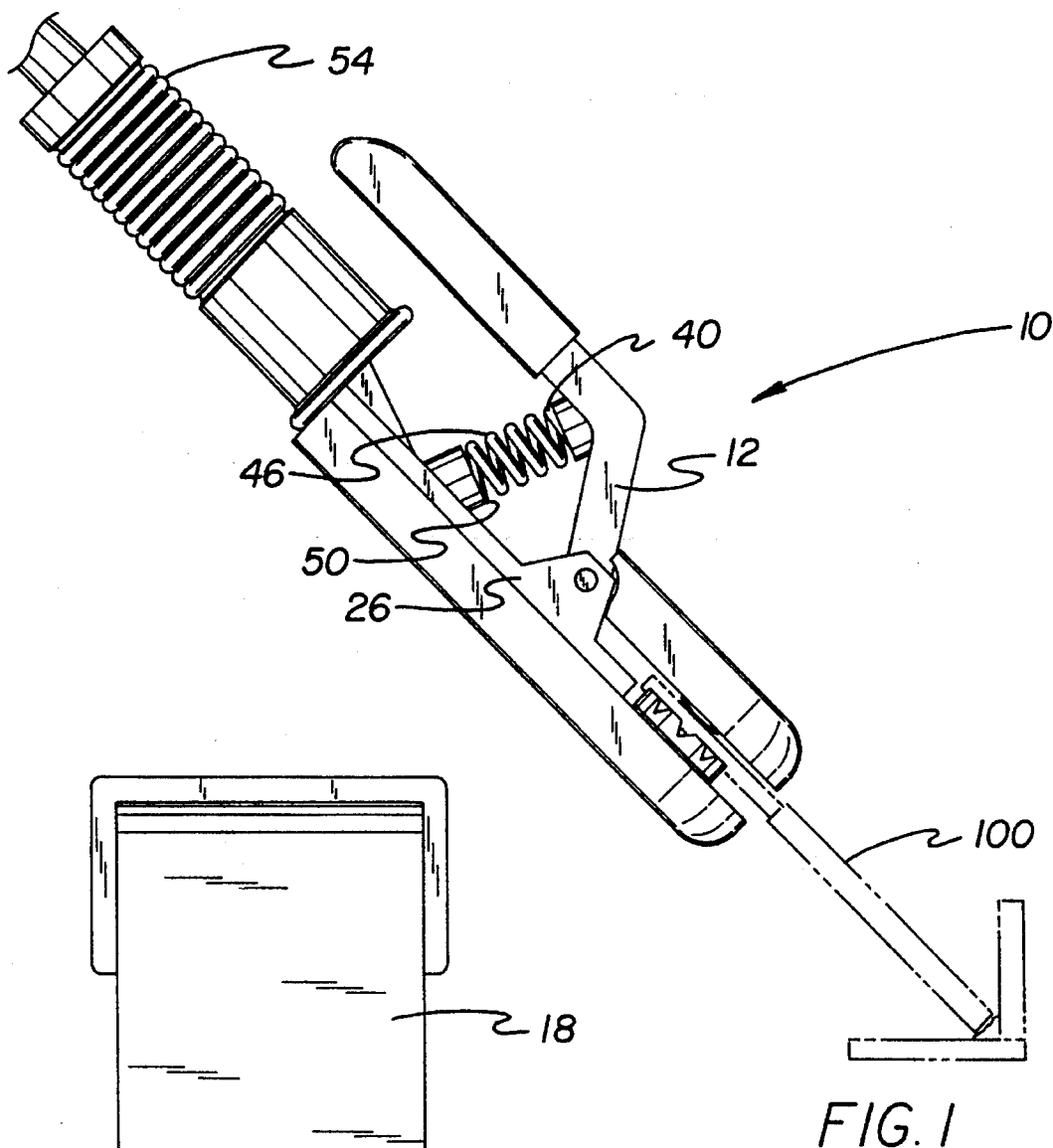
FIG. 1 is a perspective view of the preferred embodiment of the orbiting head welding clamp constructed in accordance with the principles of the present invention.
Figure 2:
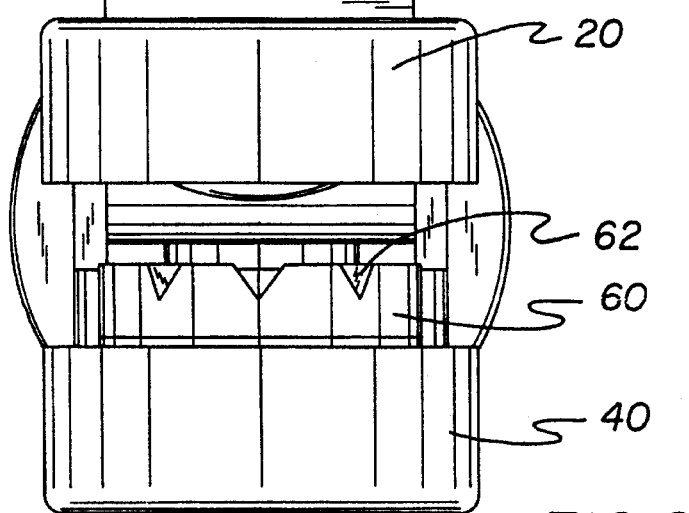
FIG. 2 is a front elevation view of the present invention.
Figure 3:
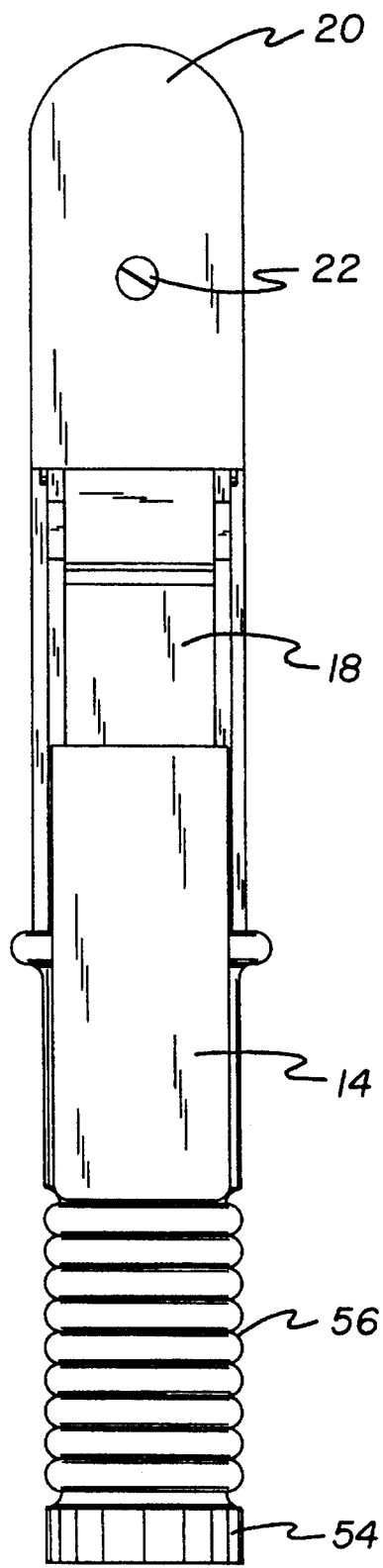
FIG. 3 is a plan view of the preferred embodiment of the present invention.
Figure 4:
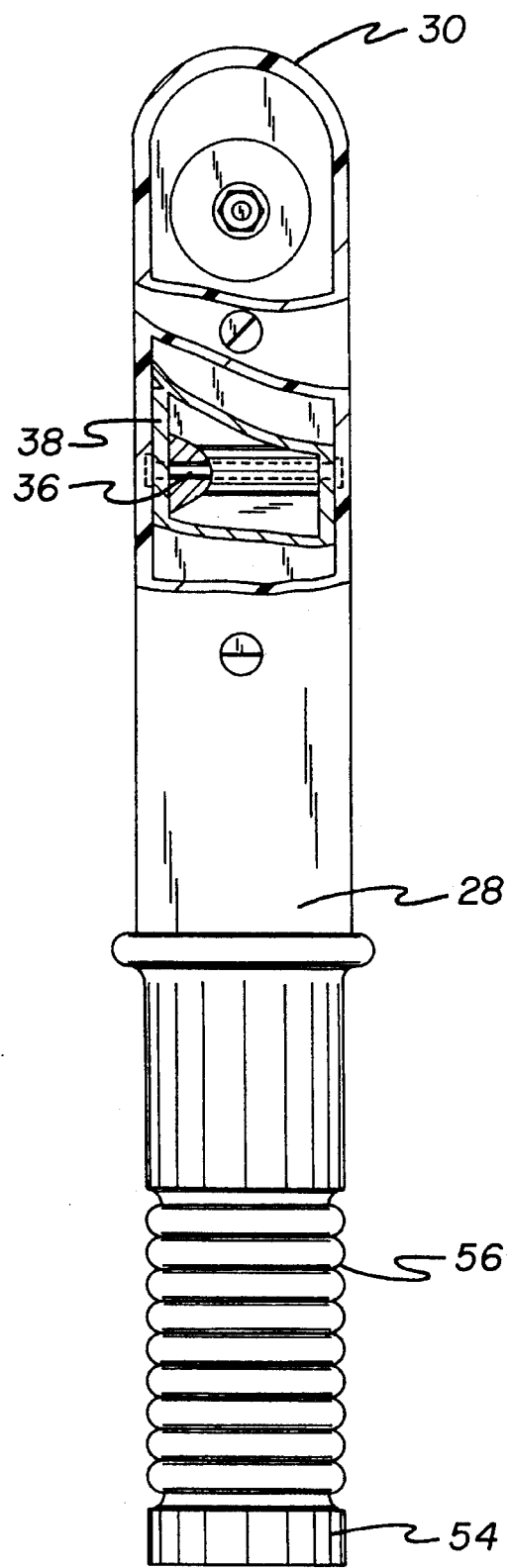
FIG. 4 is a bottom view of the preferred embodiment of the present invention.
Figure 5:
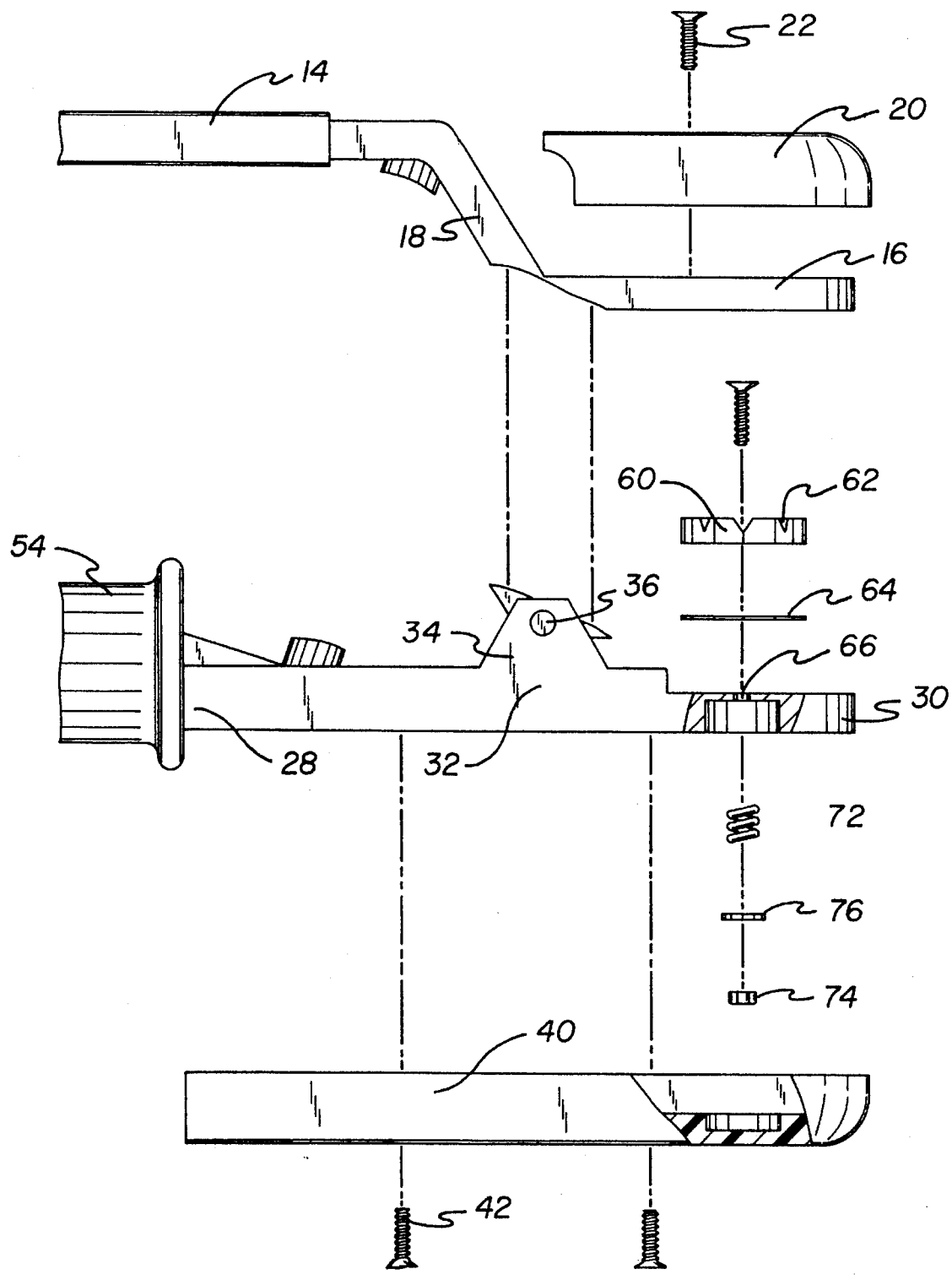
FIG. 5 is an exploded side view of the present invention.

With reference now to the drawings, and in particular, to FIGS. 1–5 thereof, the preferred embodiment of the new and improved orbiting head welding clamp embodying the principles and concepts of the present invention and generally designated by the reference number 10 will be described.

Specifically, it will be noted in the various Figures that the device relates to a new and improved orbiting head welding clamp for allowing an electrode rod to be positioned without becoming bent. In its broadest context, the device consists of an upper clamping portion, a lower clamping portion, a biasing spring, an insulated handle portion, and an orbiting disk. Such components are individually configured and correlated with respect to each other so as to attain the desired objective.

The device 10 includes an upper clamping portion 12 having a first end portion 14, a second end portion 16, and an intermediate portion 18 therebetween. The intermediate portion 18 is at an angle whereby the second end portion 16 is offset from the first end portion 14. The second end portion 16 has an insulated cover 20 secured to an upper surface thereof. The first end portion 14 is equipped with a permanent insulated layer. The insulated cover 20 is secured to the second end portion 16 by a screw 22. The first end portion 14 has a length greater than a length of the second end portion 16.

The device 10 includes a lower clamping portion 26 having a first end portion 28, a second end portion 30, and an intermediate portion 32 therebetween. The intermediate portion 32 has an upwardly extending portion 34 integral with an upper surface thereof. The upwardly extending portion 34 is pivotally coupled with a lower end of the intermediate portion 18 of the upper clamping portion 12. The pivotal coupling is facilitated by an insulated pivot pin 36 extending through side walls 38 of the upwardly extending portion 34. The lower clamping portion 26 has an insulated cover 40 secured thereto. The insulated cover is removably secured to the lower clamping portion 26 by a pair of screws 42.

The device 10 includes a biasing spring 46 having a first end 48 secured to an upper end of the intermediate portion 18 of the upper clamping portion 12. The biasing spring 46 has a second end 50 secured to the first end portion 28 of the lower clamping portion 26. The biasing spring 46 biases the second end portion 16 of the upper clamping portion against the second end portion 30 of the lower clamping portion 26. The user would simply press down upon the first end portion 14 of the upper clamping portion to temporarily release the biasing spring 46.

An insulated handle portion 54 is secured to the first end portion 28 of the lower clamping portion 26. The insulated handle portion 54 has grooves 56 formed therein to aid the user in the handling of the device 10.

An orbiting disk 60 is rotatably coupled with the second end portion 30 of the lower clamp portion 26. The orbiting disk 60 has a plurality of radial grooves 62 formed therein. The orbiting disk 60 has a fiberglass disk 64 positioned thereunder to facilitate rotation thereof. The orbiting disk 60 is positioned within a recess 66 formed in the second end portion 30 of the lower clamp portion 26. The orbiting disk is rotatable received within the recess 66. The radial grooves 62 are adapted to receive a welding rod 100 therein for a person to safely position the welding rod 100 so that an operator can weld. An outwardly extending portion 68 on the lower clamping portion 26 limits the rotation of the orbiting disk 60 by abutting the welding rod 100 positioned therein. The rotating ability of the orbiting disk 60 allows a welding operator to adjust the welding rod 100 to any angle necessary for a proper weld. The orbiting disk 60 is rotatably secured within the recess 66 by a screw 70 coupled with a spring 72, nut 74, and washer 76.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An orbiting head welding clamp for allowing an electrode rod to be positioned without becoming bent comprising, in combination:

an upper clamping portion having a first end portion, a second end portion, and an intermediate portion therebetween, the intermediate portion being at an angle whereby the second end portion is offset from the first end portion, the second end portion having an insulated cover secured to an upper surface thereof;

a lower clamping portion having a first end portion, a second end portion, and an intermediate portion therebetween, the intermediate portion having an upwardly extending portion integral with an upper surface thereof, the upwardly extending portion being pivotally coupled with a lower end of the intermediate portion of the upper clamping portion, the lower clamping portion having an insulated cover secured thereto;

a biasing spring having a first end secured to an upper end of the intermediate portion of the upper clamping portion, the biasing spring having a second end secured to the first end portion of the lower clamping portion;

an insulated handle portion secured to the first end portion of the lower clamping portion;

an orbiting disk rotatably coupled with the second end portion of the lower clamp portion, the orbiting disk having a plurality of radial grooves formed therein, the orbiting disk having a fiberglass disk positioned thereunder to facilitate rotation thereof.

2. The welding clamp as set forth in claim 1 wherein the second end portion of the lower clamping portion having means to limit the rotation of the orbiting disk to 200 degrees.

3. An orbiting head welding clamp comprising:

an upper clamping portion;

a lower clamping portion being pivotally coupled with a lower end of the upper clamping portion;

a biasing spring having a first end secured to the upper clamping portion, the biasing spring having a second end secured to the lower clamping portion;

an insulated handle portion secured to the lower clamping portion;

an orbiting disk rotatably coupled with the lower clamp portion, the orbiting disk having a plurality of radial grooves formed therein, the orbiting disk having a fiberglass disk positioned thereunder to facilitate rotation thereof.

4. The welding clamp as set forth in claim 3 wherein the upper clamping portion having a first end portion, a second end portion, and an intermediate portion therebetween, the intermediate portion being at an angle whereby the second end portion is offset from the first end portion, the second end portion having an insulated cover secured to an upper surface thereof.

5. The welding clamp as set forth in claim 4 wherein the lower clamping portion having a first end portion, a second end portion, and an intermediate portion therebetween, the intermediate portion having an upwardly extending portion integral with an upper surface thereof, the upwardly extending portion being pivotally coupled with a lower end of the intermediate portion of the upper clamping portion, the lower clamping portion having an insulated cover secured thereto.

* * * * *